US007242934B2

(12) United States Patent
Kubosawa

(10) Patent No.: US 7,242,934 B2
(45) Date of Patent: Jul. 10, 2007

(54) MOBILE COMMUNICATION TERMINAL

(75) Inventor: Nobuyoshi Kubosawa, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 10/155,968

(22) Filed: May 29, 2002

(65) Prior Publication Data
US 2002/0183062 A1   Dec. 5, 2002

(30) Foreign Application Priority Data
Jun. 1, 2001   (JP)   ............... 2001-166788

(51) Int. Cl.
*H04Q 7/20* (2006.01)
(52) U.S. Cl. ............... 455/436; 455/437; 455/438; 455/439; 455/440; 455/442; 455/443; 455/435.2
(58) Field of Classification Search ............ 455/436, 455/435.1, 435.2, 435.3, 432.1, 437, 438, 455/555, 439, 446; 320/328
See application file for complete search history.

(56) References Cited

U.S. PATENT DOCUMENTS

| 5,260,988 | A |  | 11/1993 | Schellinger et al. |
| 5,903,832 | A | * | 5/1999 | Seppanen et al. ........ 455/435.3 |
| 5,995,849 | A | * | 11/1999 | Williams et al. ............ 455/555 |
| 6,347,217 | B1 | * | 2/2002 | Bengtsson et al. ......... 455/67.7 |
| 6,438,378 | B1 | * | 8/2002 | Kouno ....................... 455/439 |
| 6,449,264 | B1 | * | 9/2002 | Lehtinen et al. ............ 370/328 |
| 2002/0123340 | A1 | * | 9/2002 | Park .......................... 455/424 |
| 2002/0160785 | A1 | * | 10/2002 | Ovesjo et al. .............. 455/453 |

FOREIGN PATENT DOCUMENTS

| JP | 411285049 A | * 10/1999 |
| JP | 2000-505261 | 4/2000 |
| JP | 2001-36937 | 2/2001 |
| WO | 95/23485 | 8/1995 |
| WO | 96/12377 | 4/1996 |
| WO | 01/06803 | 1/2001 |
| WO | 01/22764 | 3/2001 |

* cited by examiner

*Primary Examiner*—Joseph Feild
*Assistant Examiner*—David Nguyen
(74) *Attorney, Agent, or Firm*—Young & Thompson

(57) ABSTRACT

A mobile communication terminal, in which a user of the mobile communication terminal can designate handover among plural communication systems, is provided. The mobile communication terminal provides radio sections for different communication systems, which establish, connect, and disconnect radio lines, and measure communication quality at the communication systems, a controller, which controls each of the radio sections so that each of the radio sections establishes, connects, and disconnects a radio line, and measures the communication quality at each of the communication systems, and also controls handover operation among the communication systems by changing the operation of the radio sections, and an operating section which exchanges information with a user of the mobile communication terminal.

12 Claims, 5 Drawing Sheets

MOBILE COMMUNICATION TERMINAL

BACKGROUND OF THE INVENTION

The present invention relates to a mobile communication terminal, in particular, which can communicate in plural communication systems.

DESCRIPTION OF THE RELATED ART

At the code division multiple access (CDMA) communication system, whose communication service will start in the U.S.A. and Europe, mobile communication terminals are required to have a function that can communicate in both of the CDMA communication system and the global system for mobile communications (GSM) communication system, and further required to have a handover function between both the communication systems.

At the CDMA communication system, the security for communication contents is high and high speed data communication can be realized. However, at its initial stage, it is anticipated that its service area is narrow and its communication charge is high.

On the contrary, at the GSM communication system, its service area is wide and its communication charge is low, however, it has a disadvantage that the data communication speed is low.

By utilizing the handover function between the CDMA and GSM communication systems, it can be realized that a radio line is hardly cut off during speaking or delivering data.

As a handover technology between two communication systems, Japanese Patent Application Laid-Open No. 2000-505261 has disclosed a method and a system for the coexistence of the CDMA and GSM communication systems. In this patent application, a switching method, from the CDMA communication system to the GSM communication system during speaking or delivering data, has been described.

And as another handover technology between two communication systems, Japanese Patent Application Laid-Open No. 2001-36937 has disclosed a mobile communication terminal being capable of communicating in plural communication systems and a handover switching method during speaking. In this patent application, a handover technology, between two communication systems of the personal digital cellular (PDC) and the personal handy-phone system (PHS), has been described. And when the handover switching failed during speaking within one of the communication systems, the handover to the other communication system is executed, and the communication can be continued.

At a conventional mobile communication terminal, which can execute handover between two different communication systems, like as mentioned above, the handover, between the two communication systems, is executed based on the communication quality and without informing the user of the mobile communication terminal about the handover. For example, in case that a user of a mobile communication terminal started to call by selecting the GSM communication system, when the communication quality of the GSM communication system became a value being lower than a designated value and the communication quality of the CDMA communication system became a value being higher than the designated value, the handover, from the GSM communication system to the CDMA communication system, is executed without informing the user of the mobile communication terminal about the handover. On the contrary, in case that a user of a mobile communication terminal started to call by selecting the CDMA communication system, when the communication quality of the CDMA communication system became a value being lower than a designated value and the communication quality of the GSM communication system became a value being higher than the designated value, the handover, from the CDMA communication system to the GSM communication system, is executed without informing the user of the mobile communication terminal about the handover.

Therefore, for example, in case that a user of a mobile communication terminal started to call by selecting the GSM communication system, and after this, the handover, from the GSM communication system to the CDMA communication system, was executed, there is a problem that a communication charge, which is larger than expected, is charged to the user of the mobile communication terminal.

Further, in case that a user of a mobile communication terminal started to communicate to a site for receiving moving pictures at real time by selecting the CDMA communication system whose data communication speed is high, when the communication quality of the CDMA communication system became a value being lower than a designated value and the communication quality of the GSM communication system became a value being higher than the designated value, and the handover, from the CDMA communication system to the GSM communication system, was executed. In this case, there is a problem that the user of the mobile communication terminal cannot continue to receive the moving pictures at real time.

SUMMARY OF THE INVENTION

It is therefore an object of the present invention to provide a mobile communication terminal, in which a user of a mobile communication terminal can designate handover among plural communication systems.

According to a first aspect of the present invention, for achieving the object mentioned above, there is provided a mobile communication terminal. The mobile communication terminal provides plural radio means for plural communication systems being different from one another, which establish, connect, and disconnect radio lines, and measure communication quality at the plural communication systems being different from one another, a controlling means, which controls each of the plural radio means so that each of the plural radio means establishes, connects, and disconnects the radio line, and measures the communication quality at each of the plural communication systems, and also controls handover operation among the plural communication systems by changing the operation of the plural radio means, and an operating means which exchanges information with a user of the mobile communication terminal. And in case that a communication system which is used after handover operation was executed is designated via the operating means by the user, the controlling means controls to execute the handover operation based on the designation of the user.

According to a second aspect of the present invention, in the first aspect, when the handover operation designated by the user is impossible, the controlling means outputs this situation that the handover operation designated by the user is impossible via the operating means.

According to a third aspect of the present invention, in the first aspect, when the handover operation designated by the user is impossible but handover operation being different from the handover operation designated by the user is possible, the controlling means outputs this situation that the handover operation being different from the handover designated by the user is possible via the operating means.

According to a fourth aspect of the present invention, in the first aspect, the designation of the communication system with which the mobile communication terminal communicates after executing the handover operation is set before the communication starts via the operating means.

According to a fifth aspect of the present invention, in the first aspect, the designation of the communication system with which the mobile communication terminal communicates after executing the handover operation is set during the communication via the operating means.

According to a sixth aspect of the present invention, in the fourth aspect, the operating means provides a storing means in which the designation of the communication system is stored.

According to a seventh aspect of the present invention, in the fifth aspect, the operating means provides a storing means in which the designation of the communication system is stored.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
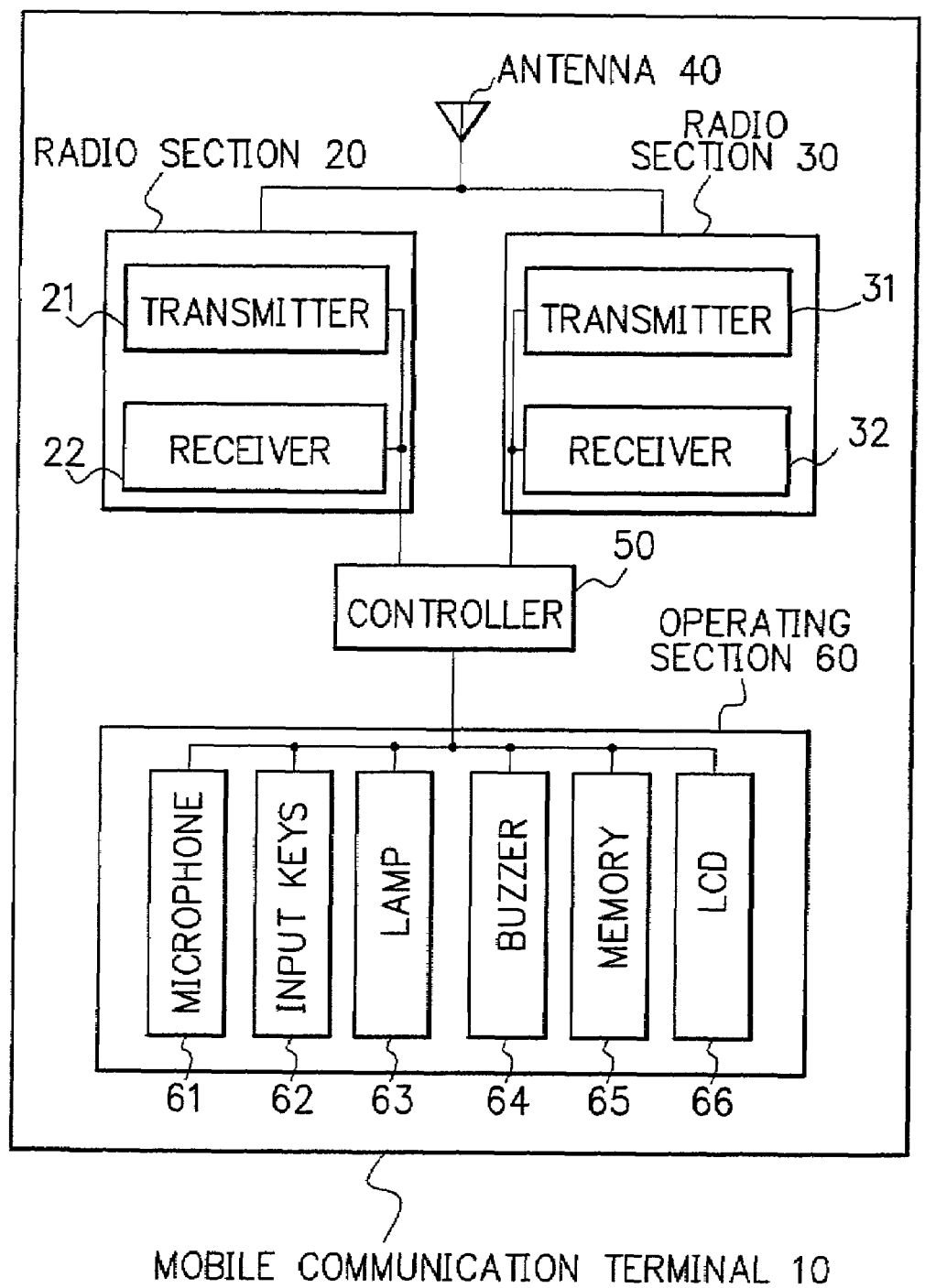
FIG. 1 is a block diagram showing a structure of a mobile communication terminal at an embodiment of the present invention.

Referring now to the drawings, an embodiment of the present invention is explained in detail. FIG. 1 is a block diagram showing a structure of a mobile communication terminal at the embodiment of the present invention.

As shown in FIG. 1, a mobile communication terminal 10 at the embodiment of the present invention consists of radio sections 20 and 30, an antenna 40, a controller 50, and an operating section 60. The radio section 20 establishes, connects, and disconnects a radio line by the CDMA communication system, and measures the communication quality of the radio line. The radio section 30 establishes, connects, and disconnects a radio line by a communication system being different from the CDMA communication system, for example, the PHS, the GSM, or the PDC communication system, and measures the communication quality of the radio line. The antenna 40 is a common antenna for the radio sections 20 and 30. The controller 50 controls handover between the CDMA communication system and the communication system of the PHS, the GSM, or the PDC, by switching the operation of the radio sections 20 and 30. The operating section 60 is an interface means with the user of the mobile communication terminal 10. The mobile communication terminal 10 has a handover function, which continues to communicate by using one of the radio sections 20 and 30 during speaking and listening to or receiving and delivering data by using the other of the radio sections 20 and 30 without cutting off the radio line. Further, the mobile communication terminal 10 has a function that the user of the mobile communication terminal 10 can select the communication system connecting to the radio line during speaking and listening to or receiving and delivering data, without cutting off the radio line.

The radio section 20 provides a transmitter 21 that transmits information by the CDMA communication system, and a receiver 22, which receives information by the CDMA communication system, and also has a function that measures the communication quality between the mobile communication terminal 10 and base stations being two or more which execute communication by the CDMA communication system. And the radio section 20 is connected to the controller 50.

The radio section 30 provides a transmitter 31 that transmits information by the communication system being different from the CDMA communication system, and a receiver 32, which receives information by the communication system using at the transmitter 31 and also has a function that measures the communication quality between the mobile communication terminal 10 and base stations being two or more which execute communication by this using communication system. And the radio section 30 is connected to the controller 50.

The controller 50 provides a central processing unit (CPU), and at a waiting time, controls the receivers 22 and 32 in the radio sections 20 and 30 by operating the receivers 22 and 32 alternately, and also individually controls communication by the two communication systems at the radio sections 20 and 30. Further, the controller 50 controls the handover between the two communication systems and receives the designation of the handover by the user, and also receives the designation of the communication system using for a radio line that is used to connect the radio line. And the controller 50 controls the receivers 22 and 32 in the radio sections 20 and 30 so that the receivers 22 and 32 measure the communication quality between the mobile communication terminal 10 and the base stations, and receives the measured result. The controller 50 is connected to the operating section 60.

The operating section 60 provides a microphone 61, input keys 62, a lamp 63, a buzzer 64, a memory 65 being a storing means, and a liquid crystal display (LCD) 66. The memory 65 stores handover information, which was designated by the user of the mobile communication terminal 10 by using the input keys 62.

The controller 50 judges whether handover is needed or not, based on the communication quality measured at the receivers 22 and 32 and information designated by the user or the handover designating information storing in the memory 65. And only a case that the handover is needed and is possible, the controller 50 executes the handover. In case that the handover is needed but is not possible, this situation is informed to the user by using one of or all of the lamp 63, the buzzer 64, and the LCD 66, and the controller 50 requires the user to input the instruction of the user.

Next, the handover, which can be executed at the embodiment of the present invention, is explained. At the embodiment of the present invention, there are four following handover (1) to (4), which the user can designate before speaking and listening to a message and before receiving and delivering data or during communication, by instructing the controller 50 by using the input keys 62 in the mobile communication terminal 10. And there is one following handover (5), which the user can designate only during communication. In this, the handover (1) is a conventional handover function, and the handover (2) to (5) is the function of the mobile communication terminal 10 of the present invention.

The handover (1) is handover to a communication system whose communication quality is the best.

The handover (2) is handover only to a communication system with which the user started to communicate.

The handover (3) is handover only to the CDMA communication system.

The handover (4) is handover only to a communication system being different from the CDMA communication system.

The handover (5) is handover to a communication system being different from the currently using communication system.

Next, referring to the drawings, handover operation of the mobile communication terminal 10 at the embodiment of the present invention is explained. In this explanation, as a first example, a case, in which the radio section 30 establishes, connects, and disconnects a radio line and also measures the communication quality, at the GSM communication system, is explained. In this, a case, in which first, the mobile communication terminal 10 started the communication at the GSM communication system, is explained.

Figure 2:
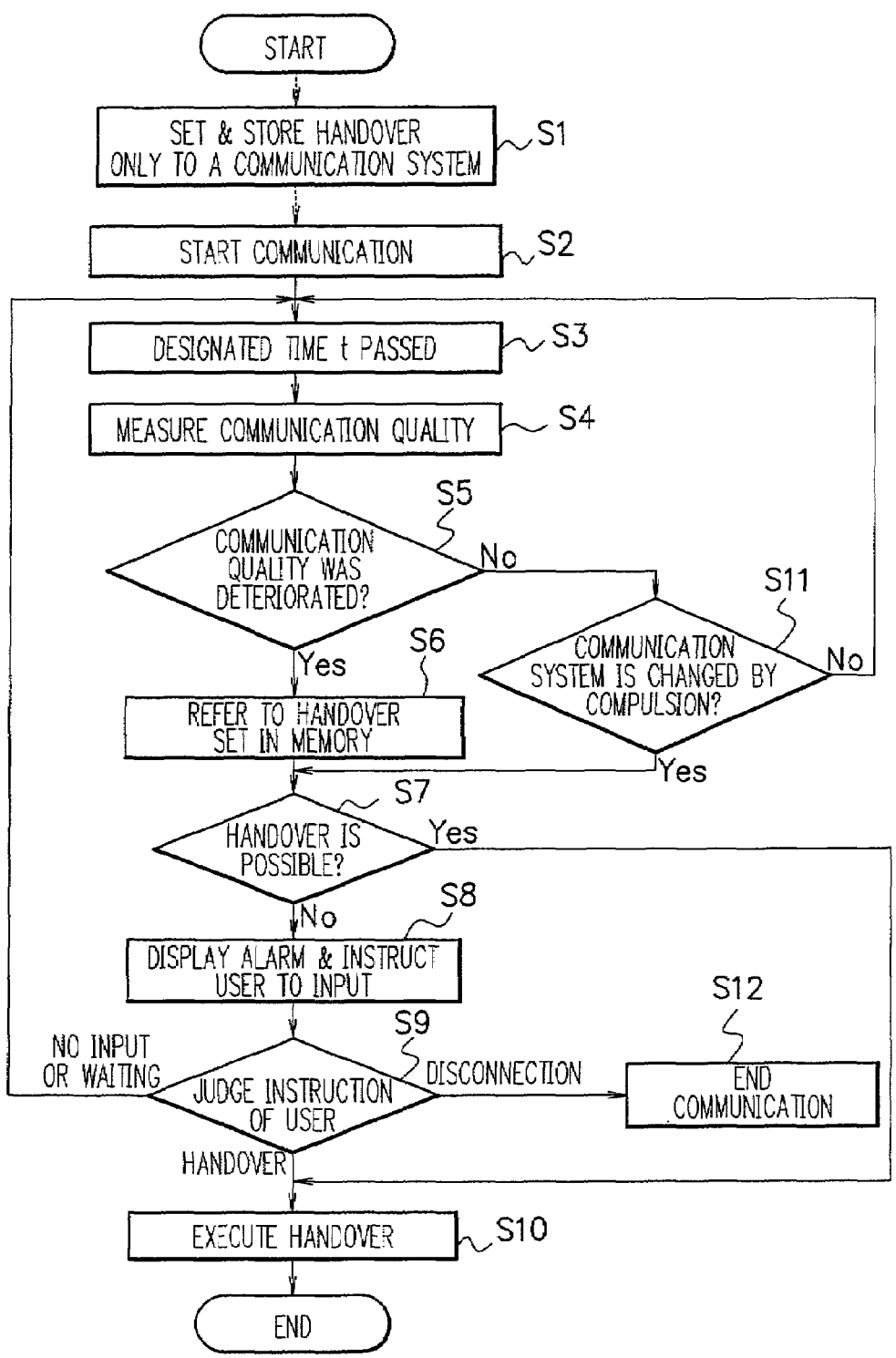
FIG. 2 is a flowchart showing handover operation of the mobile communication terminal at the embodiment of the present invention.
Figure 3:
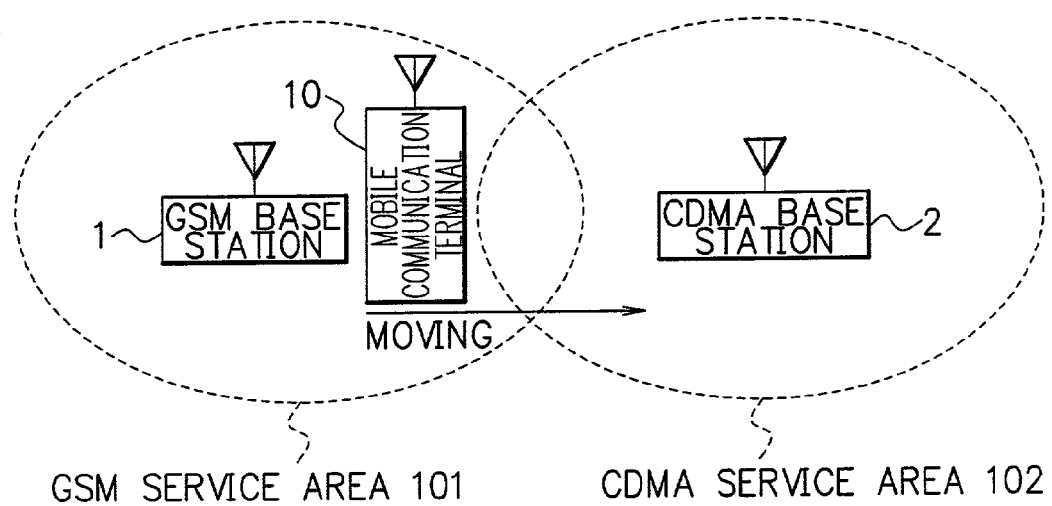
FIG. 3 is a diagram showing the handover operation at the time when the mobile communication terminal is moving from a GSM service area to a CDMA service area at the embodiment of the present invention.

FIG. 2 is a flowchart showing handover operation of the mobile communication terminal 10 at the embodiment of the present invention. FIG. 3 is a diagram showing the handover operation at the time when the mobile communication terminal 10 is moving from a GSM service area to a CDMA service area at the embodiment of the present invention.

Referring to FIGS. 1, 2, and 3, the handover operation of the first example is explained.

First, the user of the mobile communication terminal 10 selects handover only to a communication system, with which the user starts to communicate, by using the input keys 62, and the selected handover is stored in the memory 65 (step S1). That is, the selected handover is set and stored in the memory 65. In this case, the handover to the GSM communication system is selected.

As shown in FIG. 3, the mobile communication terminal 10 is moving from a GSM service area 101 to a CDMA service area 102, and it is assumed that GSM base stations, except a GSM base station 1, do not exist at the area surrounding the mobile communication terminal 10.

Next, the user of the mobile communication terminal 10 starts to communicate with the GSM base station 1 (step S2). When a designated time "t" passed after the communication started (step S3), the communication quality between the mobile communication terminal 10 and the GSM base station 1 is measured at the receiver 32 by the control of the controller 50 (step S4).

The measured result of the communication quality at the receiver 32 is inputted to the controller 50. And the controller 50 judges whether the communication quality is higher than a designated value or not (step S5), that is, it is judged whether the communication quality was deteriorated or not.

When it was judged that the communication quality was lower than the designated value (Yes at the step S5), the controller 50 refers to the handover set and storing in the memory 65, which was designated by the user by using the input keys 62 at the step S1 (step S6).

The controller 50 judges whether the handover set and storing in the memory 65 is possible or not (step S7). In this, the handover set and storing in the memory 65 is the handover only to the GSM communication system with which the user started to communicate. As shown in FIG. 3, the mobile communication terminal 10 is moving from the GSM service area 101 to the CDMA service area 102, therefore, the handover to the CDMA communication system is possible, but the handover to the GSM communication system is impossible.

When it was judged that the communication quality was higher than the designated value (No at the step S5), the controller 50 judges whether the handover to the other communication system (the CDMA communication system) has been inputted by the user by using the input keys 62 (step S11). When the handover to the CDMA communication system has been inputted by the input keys 62 (Yes at the step S11), the step goes to the step S7. When the handover to the CDMA communication system has not been inputted by the input keys 62 (No at the step S11), the step returns to the step S3. That is, at the step S11, it is judged whether the communication system is changed to the other communication system by compulsion or not.

Figure 4:
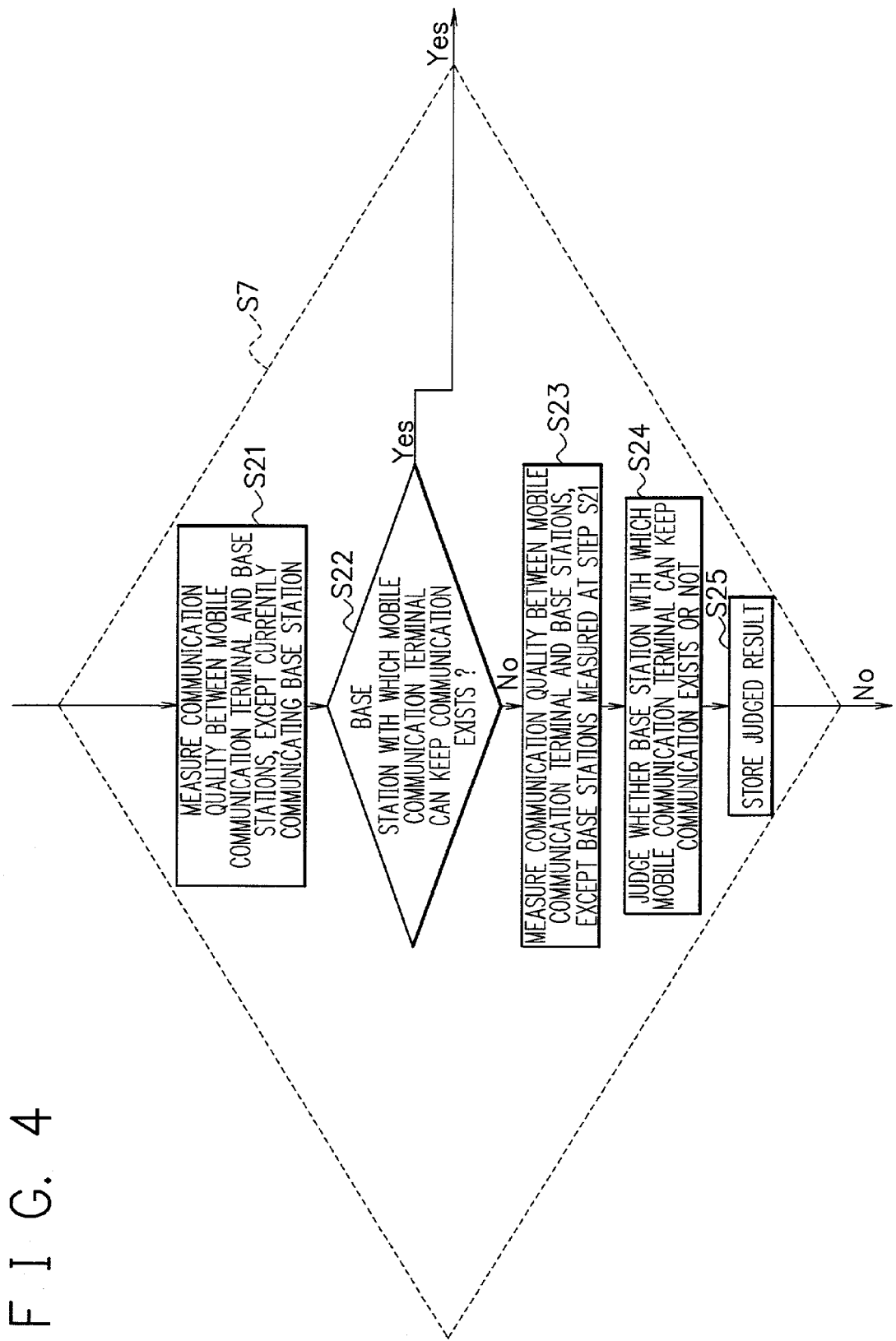
FIG. 4 is a flowchart showing operation of step S7 shown in FIG. 2 in detail.

FIG. 4 is a flowchart showing the operation of the step S7 shown in FIG. 2 in detail. Referring to FIG. 4, the operation of the step S7 is explained in detail.

First, the controller 50, based on the handover set and storing in the memory 65 referred at the step S6, controls the receiver 32 so that the receiver 32 measures the communication quality between the mobile communication terminal 10 and the other GSM base stations except the GSM base station 1 (step S21).

Next, the controller 50 judges whether the communication quality measured at the receiver 32 is higher than a designated value or not (step S22). That is, at the step S22, it is judged whether a base station, with which the mobile communication terminal 10 can keep the communication, exists or not. In this case, GSM base stations, except the GSM base station 1, do not exist at the area surrounding the mobile communication terminal 10. Therefore, the communication quality, between the mobile communication terminal 10 and the other GSM base stations except the GSM base station 1, is lower than the designated value.

Since the communication quality, between the mobile communication terminal 10 and the other GSM base stations except the GSM base station 1, is lower than the designated value, the controller 50 controls the receiver 22 so that the receiver 22 measures the communication quality between the mobile communication terminal 10 and CDMA base stations (step S23).

Next, the controller 50 judges whether the communication quality measured at the receiver 22 is higher than a designated value or not (step S24). That is, at the step S24, it is judged whether a CDMA base station, with which the mobile communication terminal 10 can keep the communication, exists or not. And the judged result is stored in the memory 65 (step S25). In this case, the mobile communication terminal 10 is moving to the CDMA service area 102 of the CDMA base station 2. Therefore, the communication quality, between the mobile communication terminal 10 and the CDMA base station 2, is higher than the designated value.

In this, the communication quality, between the mobile communication terminal 10 and the other GSM base stations except the GSM base station 1, is lower than the designated value. Therefore, this situation, which the handover to the GSM communication system, designated by the user, can not be executed, is informed to the user by using one of or all of the lamp 63, the buzzer 64, and the LCD 66. At the same time, the controller 50 reads the information in the memory 65 stored at the step S25, and displays that the handover to the CDMA communication system is possible on the LCD 66. Further, the controller 50 controls the LCD 66 so that the LCD 66 displays instructions to the user to input his/her instruction by using the input keys 62 (step S8). In this, the instructions inputting by the user by using the input keys 62 are execution of "disconnection", "waiting", and "handover to the CDMA communication system".

The controller 50 judges what the input by the user by using the input keys 62 is in the execution of "disconnection", "waiting", and "handover to the CDMA communication system" (step S9). In case that the input is the handover to the CDMA communication system, the handover to the CDMA communication system is executed (step S10).

At the step S9, in case that the instruction by the user is "waiting" or the user did not input any instruction for a designated time, the operation returns to the step S3.

In case that the instruction by the user is "disconnection", the communication ends (step S12).

At the operation mentioned above, first, the user designated the handover only to the GSM communication system. However, when the communication quality at the GSM communication system became lower than the designated value at the step S5, the handover to the CDMA communication system can be executed by the operation following the step S5, by the new instruction from the user at the step S9. Further, the user can end the communication or make a waiting state at the GSM communication system by the new instruction by the user.

Figure 5:
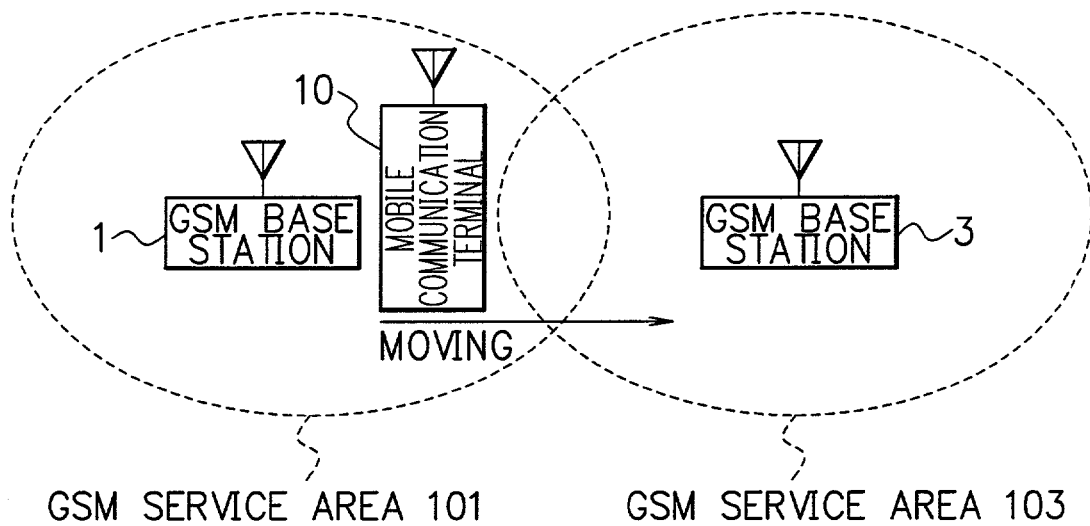
FIG. 5 is a diagram showing the handover operation at the time when the mobile communication terminal is moving from a GSM service area to another GSM service area at the embodiment of the present invention.

Next, as a second example, a case that the user designated handover to the CDMA communication system is explained. FIG. 5 is a diagram showing the handover operation at the time when the mobile communication terminal 10 is moving from a GSM service area to another GSM service area at the embodiment of the present invention.

Referring to FIGS. 1, 2, 4, and 5, the handover operation of the second example is explained.

First, the user of the mobile communication terminal 10 selects handover only to the CDMA communication system by using the input keys 62, and the selected handover is stored in the memory 65 (step S1).

In this case, as shown in FIG. 5, the mobile communication terminal 10 is moving from a GSM service area 101 to a GSM service area 103, and it is assumed that CDMA base stations do not exist at the area surrounding the mobile communication terminal 10.

Next, the user of the mobile communication terminal 10 starts to communicate with the GSM base station 1 (step S2). When a designated time "t" passed after the communication started (step S3), the communication quality between the mobile communication terminal 10 and the GSM base station 1 is measured at the receiver 32 by the control of the controller 50 (step S4).

The measured result of the communication quality at the receiver 32 is inputted to the controller 50. And the controller 50 judges whether the communication quality is higher than a designated value or not (step S5), that is, it is judged whether the communication quality was deteriorated or not.

When it was judged that the communication quality was lower than the designated value (Yes at the step S5), the controller 50 refers to the handover set and storing in the memory 65, which was designated by the user by using the input keys 62 (step S6).

The controller 50 judges whether the handover set and storing in the memory 65 is possible or not (step S7). In this, the handover set and storing in the memory 65 is the handover only to the CDMA communication system that was set by the user at the step S1. As shown in FIG. 5, the mobile communication terminal 10 is moving from the GSM service area 101 to the GSM service area 103, therefore, the handover to the CDMA communication system is impossible.

When it was judged that the communication quality was higher than the designated value (No at the step S5), the controller 50 judges whether the handover to the other communication system (the CDMA communication system) has been inputted or not by the user by using the input keys 62 (step S11). When the handover to the CDMA communication system has been inputted by the input keys 62 (Yes at the step S11), the step goes to the step S7. When the handover to the CDMA communication system has not been inputted by the input keys 62 (No at the step S11), the step returns to the step S3. That is, at the step S11, it is judged whether the communication system is changed to the other communication system by compulsion or not.

Referring to FIG. 4, the operation of the step S7 of this second example is explained in detail.

First, the controller 50, based on the handover referred at the step S6, controls the receiver 22 so that the receiver 22 measures the communication quality between the mobile communication terminal 10 and a CDMA base station (step S21). Because, the handover only to the CDMA communication system was set at the step S1.

Next, the controller 50 judges whether the communication quality measured at the receiver 22 is higher than a designated value or not (step S22). That is, at the step S22, it is judged whether a base station, with which the mobile communication terminal 10 can keep the communication, exists or not. In this case, the CDMA base station does not exist at the area surrounding the mobile communication terminal 10, as shown in FIG. 5. Therefore, the communication quality, between the mobile communication terminal 10 and the CDMA base station, is lower than the designated value.

Since the communication quality, between the mobile communication terminal 10 and the CDMA base station, is lower than the designated value, the controller 50 controls the receiver 32 so that the receiver 32 measures the communication quality between the mobile communication terminal 10 and the GSM base stations except the GSM base station 1 (step S23).

Next, the controller 50 judges whether the communication quality measured at the receiver 32 is higher than a designated value or not (step S24). That is, at the step S24, it is judged whether a GSM base station except the GSM base station 1 with which the mobile communication terminal 10 can keep the communication, exists or not. And the judged result is stored in the memory 65 (step S25). In this case, the mobile communication terminal 10 is moving from the GSM service area 101 of the GSM base station 1 to the GSM service area 103 of the GSM base station 3. Therefore, the communication quality, between the mobile communication terminal 10 and the GSM base station 3, is higher than the designated value.

In this, the communication quality, between the mobile communication terminal 10 and the CDMA base station, is lower than the designated value. Therefore, this situation, which the handover to the CDMA communication system, designated by the user, can not be executed, is informed to the user by using one of or all of the lamp 63, the buzzer 64, and the LCD 66. At the same time, the controller 50 reads the information in the memory 65 stored at the step S25, and displays that the handover to the GSM communication system is possible on the LCD 66. Further, the controller 50 controls the LCD 66 so that the LCD 66 displays instructions to the user to input his/her instruction by using the input keys 62 (step S8). In this, the instructions inputting by the user by using the input keys 62 are execution of "disconnection", "waiting", and "handover to the GSM communication system".

The controller 50 judges what the input by the user by using the input keys 62 is in the execution of "disconnection", "waiting", and "handover to the GSM communication system" (step S9). In case that the input is the handover to the GSM communication system, the handover to the GSM communication system is executed (step S10).

At the step S9, in case that the instruction by the user is "waiting" or the user did not input any instruction for a designated time, the operation returns to the step S3.

In case that the instruction by the user is "disconnection", the communication ends (step S12).

At the operation mentioned above, first, the user designated the handover only to the CDMA communication system. However, when the communication quality of the currently using GSM communication system became lower than the designated value at the step S5, the handover to the GSM communication system at the GSM base station 3 to which the mobile communication terminal 10 is moving can be executed by the operation following the step S5, by the new instruction from the user at the step S9. Further, the user can end the communication or make a waiting state at the currently using GSM communication system by the new instruction by the user.

Next, a third example of the handover operation to a communication system is explained. In the third example, when the mobile communication terminal 10 is communicating by using a communication system, a case, in which the mobile communication terminal 10 executes the handover operation to a communication system being different from the currently using communication system, is explained.

Figure 6:
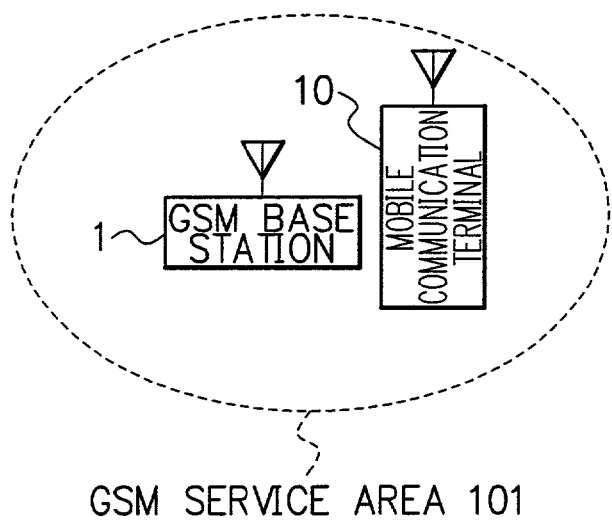
FIG. 6 is a diagram showing the handover operation to a communication system being different from currently using communication system at the embodiment of the present invention.

FIG. 6 is a diagram showing the handover operation to a communication system being different from currently using communication system at the embodiment of the present invention.

When the mobile communication terminal 10 is communicating in the GSM service area 101, at the step S11, in case that the user of the mobile communication terminal 10 selects handover to a communication system being different from the currently using communication system by using the input keys 62, in this case, the user selects the handover to the CDMA communication system, the receiver 22 measures the communication quality between the mobile communication terminal 10 and CDMA base stations by the control of the controller 50. Based on this measured result, the controller 50 judges whether the handover to the CDMA communication system is possible or not (step S7). However, as shown in FIG. 6, the CDMA base stations do not exist at the area surrounding the mobile communication terminal 10, therefore, it is judged that it is impossible to execute the handover to the CDMA communication system. Since the mobile communication terminal 10 is communicating in the GSM service area 101, the controller 50 judges that it is possible to keep the communication by the GSM communication system.

After this, the situation, which the handover to the communication system (CDMA communication system), designated by the user, being different from the currently using communication system, can not be executed, is informed to the user by using one of or all of the lamp 63, the buzzer 64, and the LCD 66. At the same time, the controller 50 reads the information in the memory 65 stored at the step S25, and displays that the communication at the currently using GSM communication system can be kept on the LCD 66. Further, the controller 50 controls the LCD 66 so that the LCD 66 displays instructions to the user to input his/her instruction by using the input keys 62 (step S8). In this, the instructions inputting by the user by using the input keys 62 are execution of "disconnection", and "waiting".

The controller 50 judges what the input by the user by using the input keys 62 is in the execution of "disconnection" and "waiting" (step S9). In case that the instruction by the user is "waiting" or the user did not input any instruction for a designated time, the operation returns to the step S3.

In case that the instruction by the user is "disconnection", the communication ends (step S12).

As mentioned above, at the third example, even when the user selects the handover to a communication system being different from the currently using communication system, if the selected communication system does not exist in the area surrounding the mobile communication terminal 10, the handover to the selected communication system is not executed, and this situation is informed to the user.

At the explanation of the embodiment of the present invention, the handover, between the CDMA communication system and one of the communication systems such as PDC, GSM, and PHS, was explained. However, at the present invention, the handover, between the CDMA communication system and two of the communication systems such as PDC, GSM, and PHS, is possible, by adding a radio section function.

In case that it is impossible to execute the handover designated by the user, it is possible to display this situation, which the handover designated by the user cannot be executed, on an instrument, such as a notebook computer and equipment for car navigation system, by connecting to the mobile communication terminal 10. And also designating the handover function and executing the handover by compulsion can be realized by using the instrument connecting to the mobile communication terminal.

Further, the handover function mentioned above can be designated to each of the telephone numbers registered in the mobile communication terminal 10.

As mentioned above, the mobile communication terminal of the present invention provides plural radio means for plural communication systems being different from one another, which establish, connect, and disconnect radio lines at the plural different communication systems, a controlling means that controls to establish, connect, and disconnect the radio lines at the plural different communication systems, and also to measure communication quality in the plural different communication systems, and further controls handover operation among the plural different communication systems by changing the operation of the plural radio means, and an operating means which exchanges information with a user of the mobile communication terminal. In case that handover only to a communication system with which the communication was started, handover only to a desiring communication system, or handover to a communication system being different from the currently using communication system is designated via the operating means before and during the communication, and the handover to a designated communication system is executed by the control of the controlling means. Therefore, in many cases such as high speed data communication is required, cutting off during the communication is must be avoided, and the communication charge is made to be low, the handover meeting the desire of the user can be executed.

Further, according to the present invention, when handover operation required by the user can not be executed, this situation is informed to the user via the operating means, and the user can select handover to other communication system. Therefore, the increase of the communication charge caused by the unnecessary handover can be prevented.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A mobile communication terminal comprising:
    plural radio means within said mobile communication terminal for plural communication systems being different from one another, which establishes, connects, and disconnects radio lines; and measure communication quality at said plural communication systems;
    a controlling means within said mobile communication terminal, which controls each of said plural radio means so that each of said plural radio means establishes, connects, and disconnects radio lines, said controlling means measuring said communication quality at each of said plural different communication systems and executing handover from one of said plural communication systems to another one of said plural communication systems by changing the operation of said plural radio means; and
    an operating means within said mobile communication terminal which exchanges information with a user of said mobile communication terminal, wherein:
    in case that a communication system which is used after handover operation was executed is designated via said operating means by said user, said controlling means controls to execute said handover operation based on the designation of said user;
    when said handover operation designated by said user is impossible, said controlling means outputs this situation that said handover operation designated by said user is impossible via said operating means.

2. A mobile communication terminal in accordance with claim 1, wherein:
    when said handover operation designated by said user is impossible but handover operation being different from said handover operation designated by said user is possible, said controlling means outputs this situation that said handover operation being different from said handover designated by said user is possible via said operating means.

3. A mobile communication terminal in accordance with claim 1, wherein:
    said designation of said communication system with which said mobile communication terminal communicates after executing said handover operation is set before the communication starts via said operating means.

4. A mobile communication terminal in accordance with claim 1, wherein:
    said designation of said communication system with which said mobile communication terminal communicates after executing said handover operation is set during the communication via said operating means.

5. A mobile communication terminal in accordance with claim 3, wherein:
    said operating means provides a storing means in which said designation of said communication system is stored.

6. A mobile communication terminal in accordance with claim 4, wherein:
    said operating means provides a storing means in which said designation of said communication system is stored.

7. A mobile communication terminal, comprising:
    plural radio transceivers, within said mobile communication terminal, each of said plural radio transceivers being structured and arranged to transmit/receive a different signal in connection with plural different communication systems and to establish, connect and disconnect radio lines and measure communication quality in connection with said plural different communication systems;
    a controller within said mobile communication terminal and connected to said plural radio transceivers and that controls said plural radio transceivers, and said controller judging a communication quality of each of said plural different communication systems and executing a handover from one communication system to a different communication system; and
    an operating member within said mobile communication terminal and connected to said controller and which is structured and arranged to exchange information with a user of said mobile communication terminal, so that a communication system which is designated by the user executes during said handover operation;
    wherein when said handover operation designated by said user is impossible, said operating member is structured and arranged to indicate to the user that said handover operation designated by the user is impossible.

8. The mobile communication terminal in accordance with claim 7, wherein when said handover operation designated by said user is impossible but a different handover operation from said handover operation is possible, said operating member is structured and arranged to indicate that said different handover operation is possible.

9. The mobile communication terminal in accordance with claim 7, wherein said mobile communication terminal is structured and arranged so that said communication system designated by the user is input into said mobile communication terminal via said operating member, before communication commences.

10. The mobile communication terminal in accordance with claim 9, wherein said operating member includes a storing device that is structured and arranged to store the designation of said communication system.

11. The mobile communication terminal in accordance with claim 7, wherein said mobile communication terminal is structured and arranged so that said communication system designated by the user is input into said mobile communication terminal via said operating member, during communication.

12. A mobile communication terminal in accordance with claim 11, wherein said operating member includes a storing device that is structured and arranged to store the designation of said communication system.

* * * * *